United States Patent [19]

Jacob

[11] Patent Number: 4,983,048
[45] Date of Patent: Jan. 8, 1991

[54] BALL CIRCULATION BUSH FOR A LINEAR BALL GUIDE

[76] Inventor: Werner Jacob, Briandring 29, 6000 Frankfurt am Main 70, Fed. Rep. of Germany

[21] Appl. No.: 505,023

[22] Filed: Apr. 5, 1990

[30] Foreign Application Priority Data

Apr. 8, 1989 [DE] Fed. Rep. of Germany ....... 3911500

[51] Int. Cl.$^5$ ........................................... F16C 29/06
[52] U.S. Cl. ................................................ 384/43
[58] Field of Search ............................ 384/43, 45, 44; 464/168

[56] References Cited

U.S. PATENT DOCUMENTS

| | | | |
|---|---|---|---|
| 4,303,280 | 12/1981 | Geffner | 384/43 |
| 4,480,879 | 11/1984 | Reith et al. | 384/43 |
| 4,629,337 | 12/1986 | Teramachi | 384/43 |
| 4,695,170 | 9/1987 | Teramachi | 384/43 |

Primary Examiner—Lenard A. Footland
Attorney, Agent, or Firm—Toren, McGeady & Associates

[57] ABSTRACT

The invention relates to a ball circulation bush having a longitudinal slot which, in its cross-section embraces an at least partially circular guiding rail. The balls of the circumferentially distributed ball rows are guided in a cage and, with their carrying portion, are arranged in a radial plane which is circumferentially offset relative to the radial plane of the balls in the returning portion. Furthermore, the balls in the returning portion are arranged on a larger diameter than those in the carrying portion. The cage is designed in several parts and includes indentically designed guiding parts and head pieces which are held relative to each other by stabilizing bars attached in bores and aligned in the solid bush via centering cams. In the regions which at the same time serves as the race for the balls in the carrying portion, the bush is designed to be thick-walled. At its ends the bush is provided with bore steps and with thin walls where the guiding parts and the head pieces are hold by holding rings and beaded edges.

17 Claims, 6 Drawing Sheets

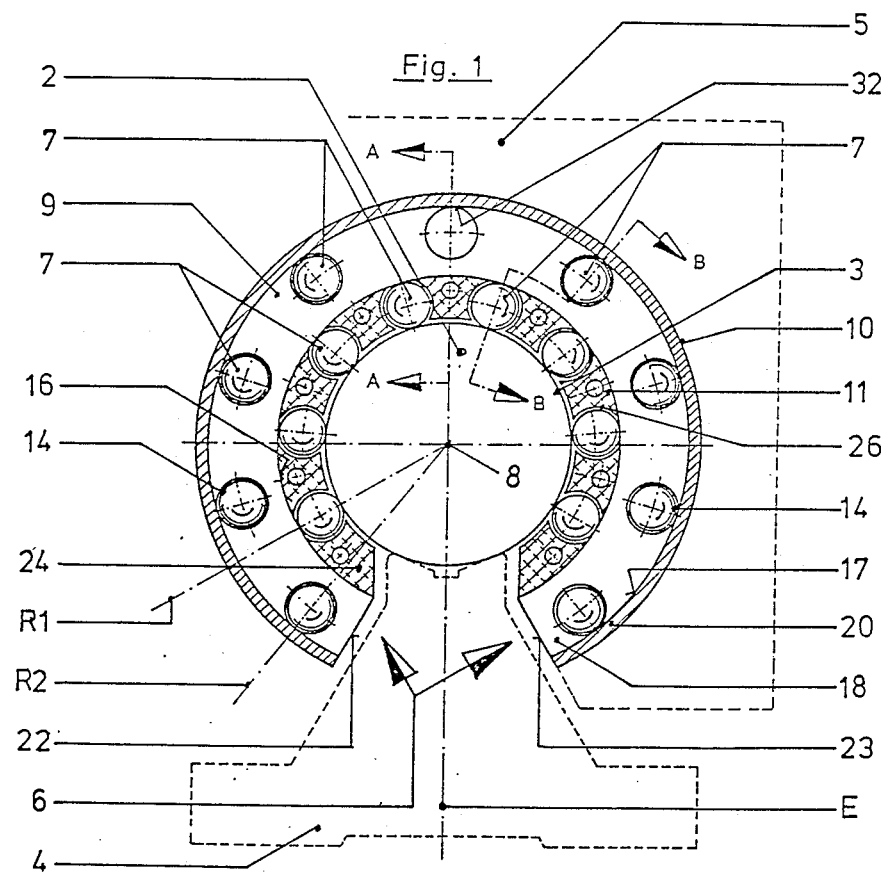

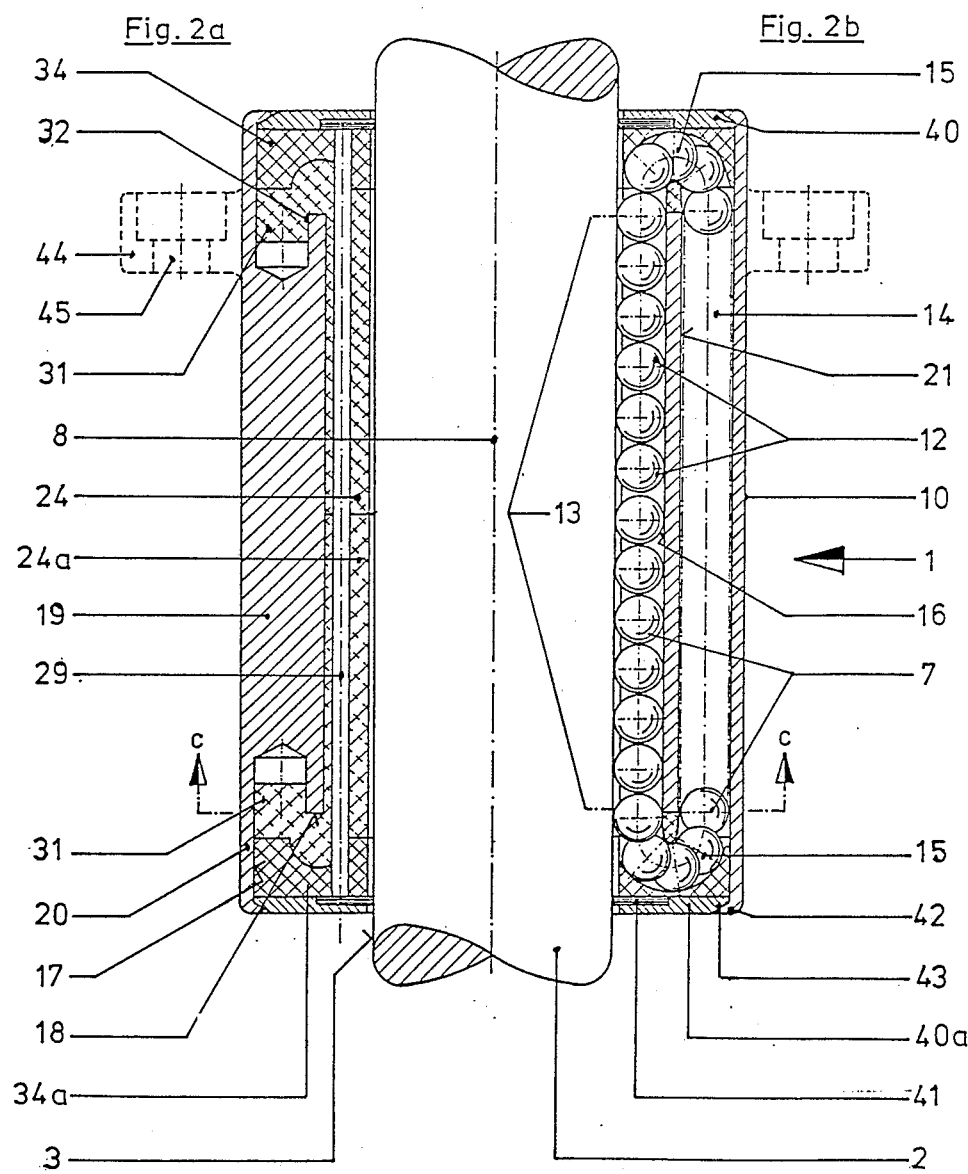

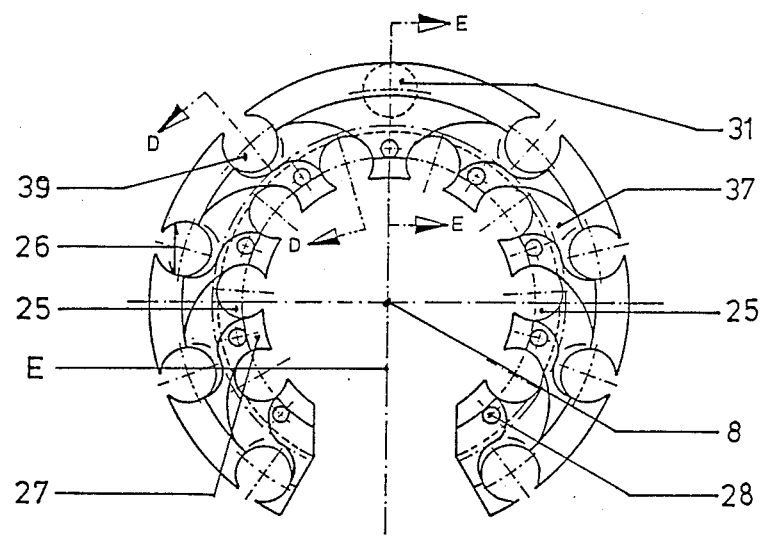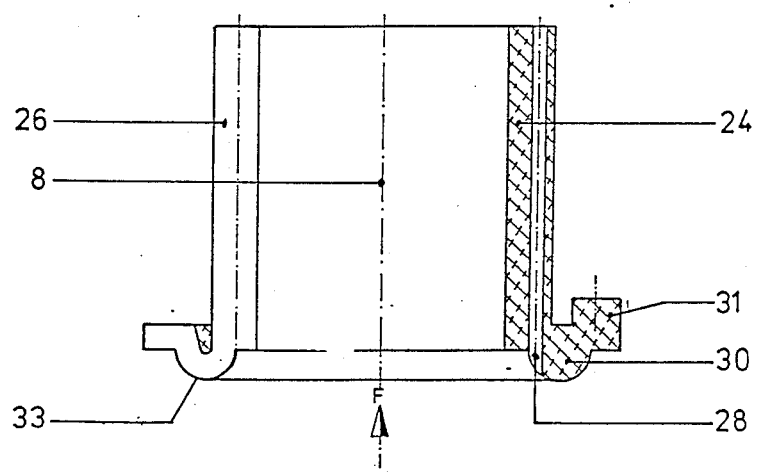

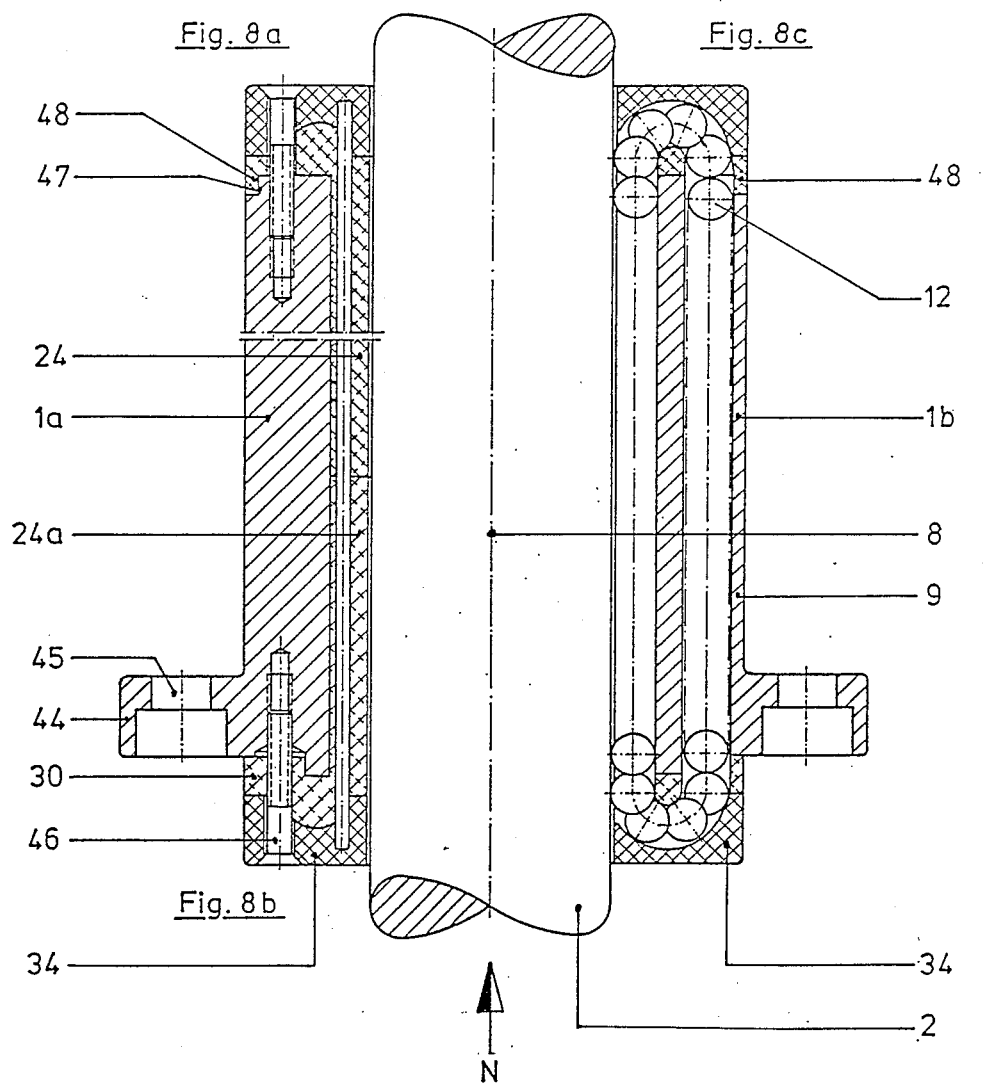

BALL CIRCULATION BUSH FOR A LINEAR BALL GUIDE

BACKGROUND OF THE INVENTION

The invention relates to a ball circulation bush with a longitudinal slot, which braces a guiding rail having an at least partially circular cross-section. Several continuous rows of balls are distributed along the cross-section and guided in a cage, and a carrying portion extends parallel to the longitudinal axes of the bush and guiding rail. The balls project from the cage while resting against the guiding rail; a returning portion; and deflecting portions connecting the two at their ends, with the balls in the carrying portion being supported on the bush races.

With such ball bushes it is known to design the outer carrying races on which the balls in the carrying portion are supported so that they consist of individual race segments. The balls in one ball row are arranged so that the balls contained in the two portions, i.e. the carrying portion and returning portion, are positioned in a plane extending at right angles relative to the radius with reference to the longitudinal axis of the guiding rail and through the centers of the balls contained in the carrying portion. The individual race segments are accommodated in a carrier.

The disadvantage of this design is that the receiving bore for the ball circulation in the component to be supported has to be produced very accurately in order to achieve the desired conditions of play. Furthermore, the bore has to be such that all ball guiding rows participate in the transmission of load, if at all possible. The divided design has a further disadvantage in that the receiving bush itself cannot accommodate any forces—or it can accommodate forces to a very limited extent only. Furthermore, relative to the forces to be transmitted, the bush is relatively large if a certain number of ball rows is required so that the carrying portions and returning portions are arranged practically on the same diameter.

Other designs have been proposed in the case of which due to the fact that the two portions, i.e. the carrying portion and the returning portion, are arranged in a joint plane, a larger number of carrying rows may be arranged on the cross-section but this arrangement, too, leads to an increase in the diameter.

SUMMARY OF THE INVENTION

It is the object of the present invention to provide a ball circulation bush which is ready for being built in, in the case of which the design of the receiving means has practically no effect on the quality of guidance and which, additionally, achieves a high load bearing capacity and a simplified design regarding arrangement and assembly of the individual components.

Pursuant to this object, and others which will become apparent hereafter, one aspect of the present invention resides in the bush being a solid bush whose inner face serves as a race for the balls contained in the carrying portions. The carrying portions and returning portions are arranged in radial planes circumferentially offset relative to each other, with the returning portions being arranged on a larger diameter than the carrying portions and being formed by bores in the bush and with the ball rows being distributed in such a way that the returning portions are directly adjacent to the slot limiting faces. Additionally, the cage is designed in several parts, consisting of two identical guiding parts inserted into the bush from its two ends, laterally guiding the balls in the carrying portion and having radially inwardly and outwardly open longitudinal slots and a flange with a first portion of the deflecting portion for transferring the balls into the returning portion, as well as head pieces to be attached at the head ends of the two guiding parts and comprising the second portion of the deflecting portion. The cage further comprises means for centering the two guiding parts and the head pieces relative to each other and to the bush.

The advantage of this design is that the available circular arch with which the ball circulation unit surrounds the guiding rail is used in an optimum way for providing the ball rows. The circumferential offset ensures that the balls contained in the carrying portion are supported by the bush in an optimum way because in these regions the entire cross-section is available for receiving the load. By arranging the portions in radial planes which are offset relative to each other it is possible to achieve a compact design while additionally ensuring accurate deflection of the balls, without any jolting or jamming, from the carrying portion into the returning portions and vice-versa. As the returning portions of the ball rows adjoining the longitudinal slots are immediately adjacent to the limiting faces and as the returning portions are arranged on a larger diameter than the carrying portions, it is possible, with the same space requirements relative to the state of the art, to accommodate a larger number of ball circulation rows. Furthermore, in the region where the main load is applied which, as a rule, is the plane containing the slot center and the longitudinal axis, it is possible to arrange the carrying ball rows more closely together. Furthermore, arranging the individual portions in offset radial planes permits the use of larger balls which also have a higher carrying capacity. Also, a simpler design is achieved in that the parts of which the cage is composed are practically identical and the position of the joints permits production without undercuts so that the plastic parts may be produced by injection molding involving simple tools and permitting close tolerances.

In a further embodiment of the invention the ball rows are designed to be symmetrical relative to a plane containing the longitudinal axis of the bush and the central plane of the longitudinal slot.

In another embodiment of the invention, the bush, viewed in its longitudinal section, at the side of the inner face forming the race, is provided with bored steps whose diameter is greater than that of the bore representing the inner face and in which the guiding parts and the head pieces are accommodated and secured. This facilitates assembly and centering of the components.

To permit accurate assembly and centering the guiding parts should each comprise a centering cam axially projecting from their flange in the direction of the annular face of the bored step and engaging corresponding centering recesses which start from the annular faces. This design permits one circumferential direction, allowing accurate centering of the individual channels relative to each other.

For centering the guiding parts and head pieces, the guiding parts are provided with an annular centering bead and the head pieces are provided with a corresponding annular centering groove.

For increasing the carrying capacity and stability, and for aligning the individual components of the cage relative to each other, in a further embodiment of the invention, the guiding parts and head pieces are provided with circumferentially distributed bores which extend parallel to the longitudinal axis and into which stabilizing bars are inserted. These stabilizing bars hold the guiding parts in an aligned position relative to each other and considerably increase the strength of the cage.

The bores are preferably arranged in the webs between two carrying portions of the guiding parts.

The centering recess for the centering cam is preferably arranged on the plane of symmetry so that effective use is made of the space resulting in this region due to the fact that the returning portions of the two adjoining ball rows are at a maximum circumferential distance from one another.

For fixing the multi-component cage in the bush, the holding rings are inserted into the bored steps so as to rest against the end faces of the head pieces, which holding rings are fixed radially inwardly by beading the wall of the bush. This measure increases the stiffness of the unit. In a preferred embodiment, the holding rings are additionally provided with a recess for receiving a sealing ring.

For obtaining a segment bush it is also conceivable to divide it into several complementary circular segments, with both the bush as well as the guiding parts and head pieces being divided into corresponding segments.

If the bush is divided into segments, the guiding parts may be held by a centering edge on a centering step of the bush segment.

The stabilizing bars, on the other hand, are made of steel. To permit simple fixing of the ball circulation bush, the invention further proposes that the bush should be provided with an assembly flange which serves to fix the ball circulation bush on a component to be supported on the guiding rail.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a cross-section C—C through a ball circulation bush supported on the guiding rail of FIG. 2;

FIGS. 2 shows two longitudinal sections, i.e.:

FIG. 2a (left-hand half of FIG. 2) is a section A—A according to FIG. 1;

FIG. 2b (right-hand half of FIG. 2) is a section B—B according to FIG. 1;

FIG. 3 is a view of an end face of a guiding part;

FIG. 4a (left-hand half of FIG. 4) is a section D—D according to FIG. 3;

FIG. 4b (right-hand half of FIG. 4) is a section E—E according to FIG. 3;

FIG. 8a (left-hand upper half of FIG. 8) is a section L—L according to FIG. 7;

FIG. 8b (left-hand lower half of FIG. 8) is a section K—K according to FIG. 7; and FIG. 8c (right-hand half of FIG. 8) is a section M—M according to FIG. 7.

DETAILED DESCRIPTION OF PREFERRED EMBODIMENT

Figure 5:
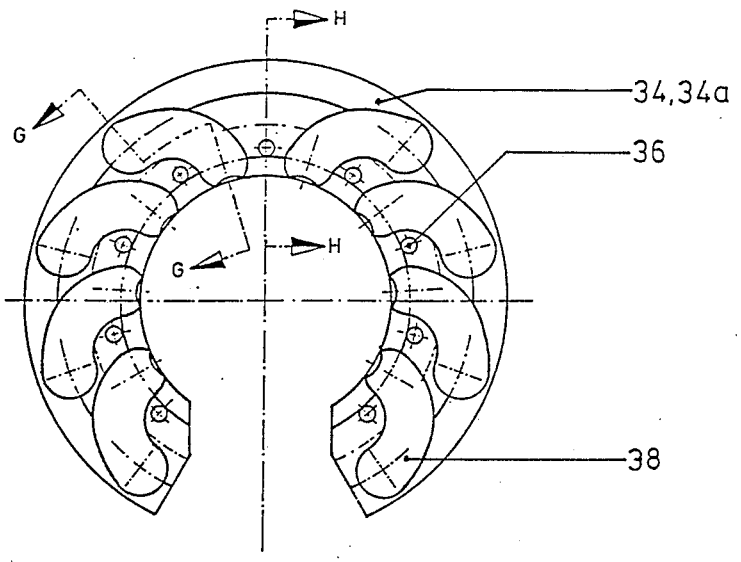
FIG. 5 is a view according to the direction of arrow J of FIG. 6 of an end face, i.e. the head piece end face comprising the deflecting race.

As seen in the drawings, the ball circulation bush 1 serves to support a table 5 or machine part on a guiding rail 2. The guiding rail 2 has a circular cross-section and is provided with a fixing element 4 via which the guiding rail 2 may be fixed to a base. The guiding rail 2 may form part of the fixing element 4 or it may be connected to it via suitable threaded connections. The ball circulation bush 1 is slotted in its cross-section. The longitudinal slot has been given the reference number 6. The cross-section of the ball circulation bush 1 comprises circumferentially distributed ball rows 7. Each ball row 7 consists of a carrying portion 13, a returning portion 14 and deflection portions 15 connecting the two other portions 13, 14 at their ends. In the region of the carrying portion 13, the balls 12 guided in the cage 11 project from the cage and are supported on the outer face 3 of the guiding rail 2.

Figures 6, 6A, 6B:
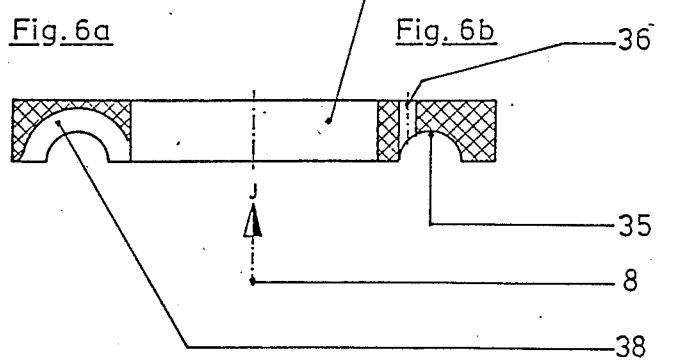
FIG. 6a (left-hand half of FIG. 6) is a section G—G according to FIG. 5.
FIG. 6b (right-hand half of FIG. 6) is a section H—H according to FIG. 5.

In the carrying portion 13 and the returning portion 14, the balls 12 are guided in such a way that their centers are arranged on an axis which extends parallel to the longitudinal axis 8 of the guiding rail in the bush 9. As can be seen in FIG. 1, the carrying portion 13 and returning portion 14 are circumferentially offset relative to each other in radial planes R1 and R2. Furthermore, the returning portion 14 is arranged on a larger diameter relative to the longitudinal axis 8 than the balls contained in the carrying portion 13. The first ball rows 7 adjacent to the slot 6 are arranged in such a way that the returning portions 14 immediately adjoin limiting faces 22, 23 of the longitudinal slot 6. The returning portions 14 are formed by bores 21 in the bush 9. The central region of the bush 9 is designed to be thick-walled. The thick-walled region has been given the reference number 19. At its ends the thick-walled region 19 is followed by two thin-walled regions 20 formed by a bored step 17. The annular face occurring as a result of the bored step has been given the reference number 18. In the carrying portion 13 the balls 12 are supported on the outer face 3 of the guiding rail 2, on the one hand, and in the inner face 16 formed by the bore in the bush 9, on the other hand. The elements forming the cage 11 are inserted into the bore 16 from the two end faces of the bush 9. The multi-component cage 11 consists of two guiding parts 24, 24a which are identical and are explained in more detail in connection with FIGS. 2 to 4. Furthermore, the cage 11 comprises two head pieces 34, 34a attached at its ends. The arrangement of the head pieces 34, 34a is shown in FIG. 2, and their design is illustrated in detail in FIGS. 5 and 6.

There will now follow a description of the guiding parts 24, 24a and their arrangement in the bush 9. The two identically designed guiding parts 24, 24a are sleeve-like, with one end of theirs being provided with a flange-like projection 30. The guiding parts comprise longitudinal slots 25 which extend in the longitudinal direction, i.e. parallel to the axis 8 and which are radially outwardly and inwardly open, allowing the balls 12 to project through them. The webs 27 provided between two slots 25 comprise circular arch-shaped guiding faces 26 for laterally guiding the balls 12. The webs 27 allow the balls 12 to be supported on the inner face 16 of the bush 9 and on the outer face 3 of the associated guiding rail 2. The flange 30 of the guiding parts 24, 24a, on its end face, facing the annular face 18 of the bored step 17, comprises an axially projecting centering cam 31 arranged in the plane of symmetry E. The centering cam 31 engages the centering recess 32 in the annular face 18 of the thick-walled region 19 of the bush 9. On the outwardly directed end face of the flange 30 there has been provided an annular centering bead 33 for centering the head pieces 34, 34a. Furthermore, deflecting races 37 have been formed into this end face which forms a first portion of the deflecting portion 15. The deflecting races 37, together with their complementary ball deflecting races 38 in the two head pieces 34, 34a form a closed channel for deflecting and guiding the balls 12 from the carrying portion 13 into the returning portion 14 formed by the bore 21 in the bush 9.

The head pieces 34, 34a are provided with centering grooves 35 which correspond to the centering bead 33 and which ensure radial alignment of the head pieces 34, 34a relative to the guiding parts 24, 24a. The centering cams 31 of the two guiding parts 24, 24a ensure circumferential alignment of the returning apertures 39 provided in the flange 30 relative to the returning bores 21 of the bush 9.

For stabilizing and centering the head pieces 34, 34a relative to the guiding parts 24, 24a, and for stabilizing and centering the guiding parts 24, 24a relative to each other, there are provided stabilizing bars 29. The stabilizing bars 29 are inserted into bores 28 of the guiding parts 24, 24a and into correspondingly arranged bores 36 of the head pieces 34, 34a. The bores 28 of the guiding parts 24, 24a are located in the region of the webs 27, and the stabilizing bars 29 are preferably made of steel and support the cage 11. The two guiding parts 24, 24a and head pieces 34, 34a are inserted into the bored step 17 and are axially held together by holding rings 40, 40a which axially adjoin the end faces of the head pieces 34, 34a and which are fixed by deforming the thin-walled region 20 of the bush 9. To facilitate beading of the thin-walled portion 20, the holding ring 9 has been provided with an inclined face 43. The beaded edge has been given the reference number 42. The two holding rings 40, 40a comprise recesses 41 accommodating seals having a sealing effect relative to the outer face 3 of the guiding rail 2. Their purpose is to prevent dirt from penetrating into the guiding means and to strip off dirt from the guiding means.

The outer face 10 of the bush 9 may be provided with a fixing or assembly flange 44 provided with fixing bores 45 for fixing the ball circulation bush 1 to the machine element or table 5 to be guided. However, it is also possible for the ball circulation bush, with its outer face 10, to be received directly and secured via a press fit in the bore of the table 5.

Figure 7:
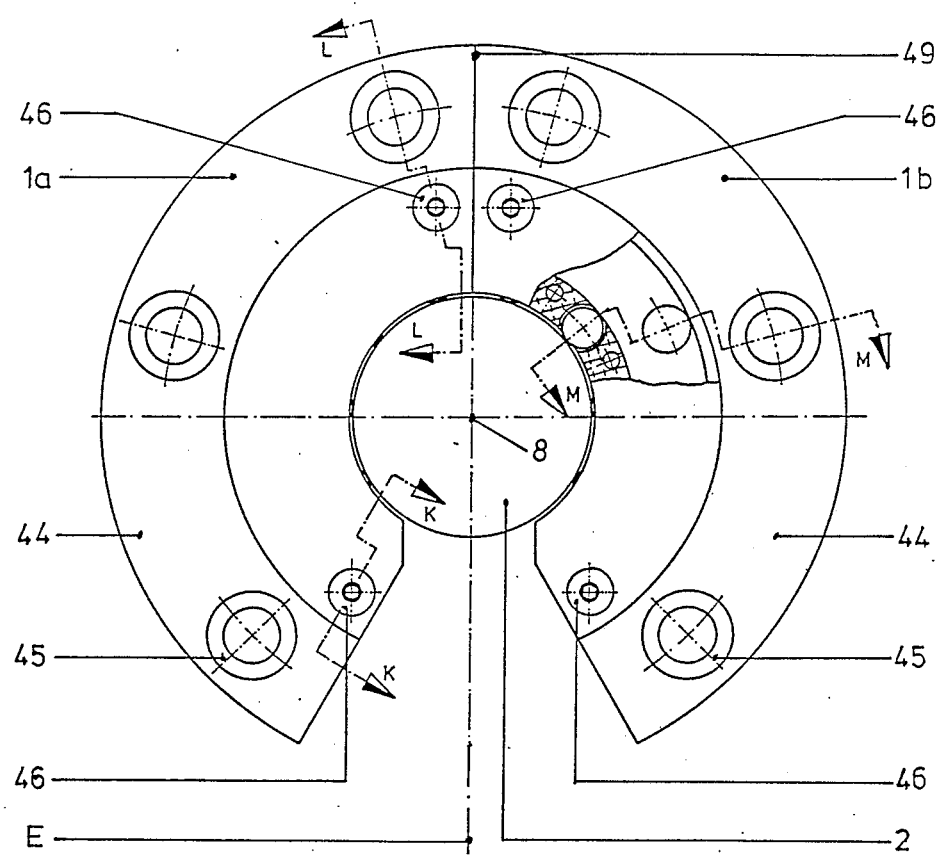
FIG. 7 is a view of a ball circulation bush composed of segments, shown in the direction of arrow N according to FIG. 8.

FIG. 1 also shows that as a result of the special arrangement of the first ball rows 7 relative to the longitudinal slot 6, in the region of the plane containing the longitudinal axis 8 and the central plane of the slot 6, there occurs a space which is suitable for providing the centering recess 32. It can also be seen that the individual ball rows 7 are arranged symmetrically relative to the plane E and that laterally of the plane of symmetry, there are provided four ball rows 7 each. Due to the position of the deflecting races 34, 38 and the slots 25, the guiding parts 24, 24a and the head pieces 34, 34a are injection molded parts made of plastics and especially two segments 1a, 1b for example, as can be seen in FIGS. 7 and 8. However, this means that the guiding parts 24, 24a also have to be divided into segments, i.e. they must be divided in the region of the joint 49. Furthermore, the guiding parts 24, 24a have to be fixed in a different way relative to the bush segment 9. For this purpose, there have been provided bolts 46 which are screwed into the wall of the bush 9 and which pass through both the head pieces 34, 34a and the flange region of the guiding parts 24, 24a. As the division into segments would not ensure a satisfactory holding effect if the ends of the bush were to be designed as bored steps, it is necessary to provide different form of centering of the guiding parts 24, 24a relative to the bush 9. Therefore, in the region of its two ends, the bush is provided with centering steps 47 over which a centering edge 48 of the guiding parts 24, 24a extends. Otherwise, the design of the guiding parts 24, 24a and of the head pieces 34, 34a corresponds to the embodiment as shown in FIG. 1.

While the invention has been illustrated and described as embodied in a ball circulation bush for a linear ball guide, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A ball circulation bush with a longitudinal slot, which embraces a guiding rail and has an at least partially circular cross-section interrupted by said longitudinal slot (6), comprising several continuous rows of balls distributed along the cross-section and guided in a cage, which rows each include a carrying portion which extends parallel to the longitudinal axes of the bush and guiding rail and in which the balls project from the cage while resting against the guiding rail, a returning portion, and deflecting portions connecting the carrying portion and the returning portion at their ends, the balls in the carrying portion being supported on bush races, the bush (9) being a solid bush having an inner face (16) which serves as a race for the balls (12) contained in the carrying portions (13), the carrying portions (13) and returning portions (14) being arranged in radial planes (R1, R2) circumferentially offset relative to each other, with the returning portions (14) being arranged on a larger diameter than the carrying portions (13), and being formed by bores (21) in the bush (9), the ball rows (7) being distributed so that the returning portions (14) are directly adjacent to limiting faces (22, 23) of the slot (6), the cage (11) having several parts, including two identical guiding parts (24, 24a) inserted into the bush (9) from its two ends, which laterally guide the balls (12) in the carrying portions (13) and have radially inwardly and outwardly open longitudinal slots (25) and a flange (30) with a first portion (37) of the deflecting portions (15) for transferring the balls (12) into the returning portions (14) and head pieces (34, 34a) attached at head ends of the two guiding parts and comprising a second portion (38) of the deflecting portions (15), and further comprising means (28, 29; 31, 32; 33, 35) for centering the two guiding parts (24, 24a) and the head pieces (34, 34a) relative to each other and to the bush (9).

2. A ball circulation bush according to claim 1, wherein the ball rows (7) are symmetrical relative to a plane (E) containing the longitudinal axis (8) of the bush (9) and the central plane of the longitudinal slot (6).

3. A ball circulation bush according to claim 2, wherein the centering recess (32) is arranged on a plane of symmetry (E) of the bush.

4. A ball circulation bush according to claim 1, wherein the bush (9), viewed in its longitudinal section, at the side of the inner face (16) forming the race, is provided with bored steps (17) having a diameter greater than that of the bore representing the inner face (16), and in which the guiding parts (24, 24a) and the head pieces (34, 34a) are accommodated and secured.

5. A ball circulation bush according to claim 4, wherein the guiding parts (24, 24a) each comprise a centering cam (31) axially projecting from their flange (30) in the direction of annular faces (18) of the bored step (17) and engaging corresponding centering recesses (32) which start from the annular faces (18).

6. A ball circulation bush according to claim 5, wherein the centering recess (32) is arranged on a plane of symmetry (E) of the bush.

7. A ball circulation bush according to claim 4, and further comprising holding rings (40, 40a) inserted into the bored steps (17) so as to rest against the end faces of the head pieces (34, 34a), the holding rings being fixed radially inwardly by beading the wall (20) of the bush (9).

8. A ball circulation bush according to claim 7, wherein the holding rings (40, 40a) are provided with recesses (41) for receiving a sealing ring.

9. A ball circulation bush according to claim 1, wherein the guiding parts (24, 24a) have an annular centering bead (33), and the head pieces (34, 34a) have a corresponding annular centering groove (35).

10. A ball circulation bush according to claim 1, wherein the guiding parts (24, 24a) and the head pieces (34, 34a) are provided with circumferentially distributed bores (28, 36) which extend parallel to the longitudinal axis (8) and into which stabilizing bars (29) are insertable.

11. A ball circulation bush according to claim 10, wherein the bores (28) are arranged in webs (27) between two carrying portions of the guiding parts (24, 24a).

12. Ball circulation bush according to claim 10, wherein the stabilizing bars (29) are made of steel.

13. A ball circulation bush according to claim 1, wherein the bush is divided into several complementary circular segments (1a, 1b).

14. A ball circulation bush according to claim 13, wherein the guiding parts (24, 24a) are held by a centering edge (48) on a centering step (47) of a bush segment (9).

15. A ball circulation bush according to claim 1, wherein the bush (9) is provided with an assembly flange (44).

16. A ball circulation bush according to claim 1, wherein the guiding parts (24, 24a) and the head pieces (34, 34a) are made of plastics.

17. In a ball circulation bush with a longitudinal slot, which embraces a guiding rail and has an at least partially circular cross-section interrupted by said longitudinal slot (6), which includes several continuous rows of balls distributed along the cross-section and guided in a cage, which rows each include a carrying portion which extends parallel to the longitudinal axes of the bush and guiding rail and in which the balls project from the cage while resting against the guiding rail, a returning portion, and deflecting portions connecting the carrying portion and the returning portion at their ends, the balls in the carrying portion being supported on bush races, the improvement comprising:

the bush (9) formed as a solid bush having an inner face (16) which serves as a race for the balls (12) contained in the carrying portions (13);

the carrying portions (13) and returning portions (14) being arranged in radial planes (R1, R2) circumferentially offset relative to each other, with the returning portions (14) being arranged on a larger diameter than the carrying portions (13), and being formed by bores (21) in the bush (9), the ball rows (7) being distributed so that the returning portions (14) are directly adjacent to limiting faces (22, 23) of the slot (6); and the cage (11) having several parts, including two identical guiding parts (24, 24a) inserted into the bush (9) from its two ends, which laterally guide the balls (12) in the carrying portions (13) and have radially inwardly and outwardly open longitudinal slots (25) and a flange (30) with a first portion (37) of the deflecting portions (15) for transferring the balls (12) into the returning portions (14), and head pieces (34, 34a) attached at head ends of the two guiding parts and comprising a second portion (38) of the deflecting portions (15), and further comprising means (28, 29; 31, 32; 33, 35) for centering the two guiding parts (24, 24a) and the head pieces (34 34a) relative to each other and to the bush (9).

* * * * *